United States Patent Office 3,299,395
Patented Jan. 17, 1967

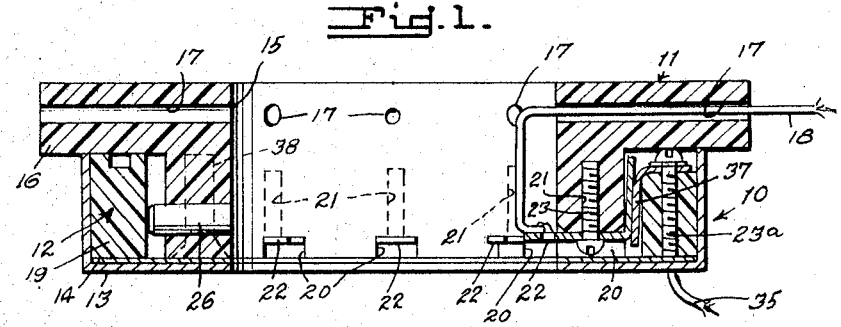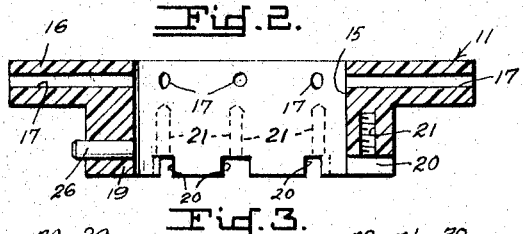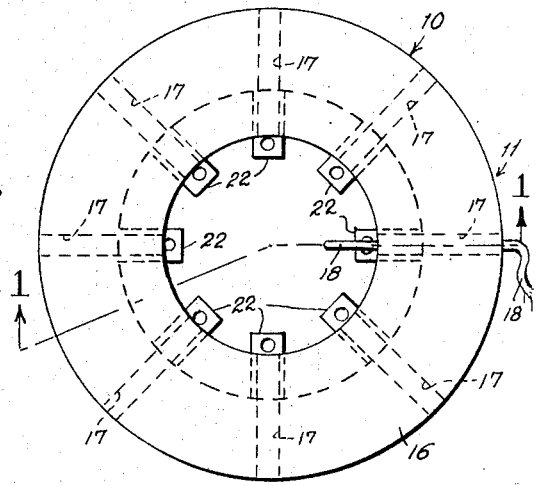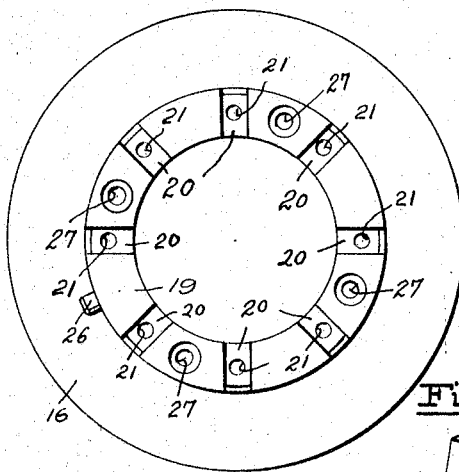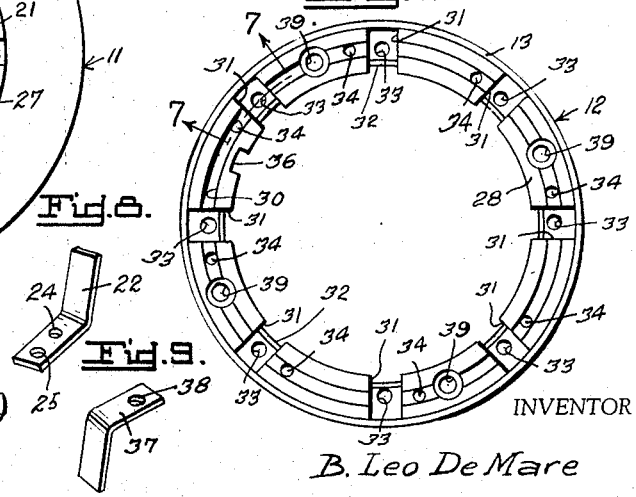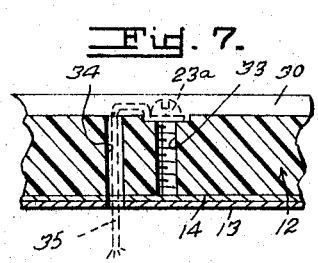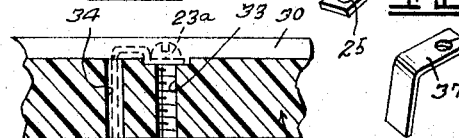

3,299,395
PANCAKE CONNECTOR
Baltzar Leo De Maré, Aberdeen, Md., assignor to the United States of America as represented by the Secretary of the Army
Filed June 22, 1965, Ser. No. 466,134
2 Claims. (Cl. 339—176)

The invention described herein may be manufactured and used by or for the Government for governmental purposes, without the payment to me of any royalty thereon.

This invention relates to a pancake connector, and more particularly to an electrical connector to provide electrical continuity between circuit components which must be positioned as close together as possible.

The connector of the present invention is especially adaptable for the purpose of establishing electrical connections between rocket motor bodies and must withstand a thrust produced by the rockets when spun around their longitudinal axis at rates of 20,000–30,000 r.p.m.

Because of the arrangement of the rocket motor components and in particular, a pressure gage extending from the bottom of the rocket motor, an annular shaped connector was required. Further, the high rotational speed of the rocket motor required that the connector be symmetrical with the axis of rotation, and its contacts be so designed that the centrifugal force would augment the integrity of the electrical connection.

Finally, the necessity of holding to a minimum the space between the rocket motor and a spinning cup on which the connector is mounted, it was required that the connector have an axial thickness as small as possible.

No commercially manufactured connector was found that embodied all the aforesaid features and the pancake connector of this invention was designed to satisfy these needs.

It is therefore a primary object of this invention to provide an electrical connector adaptable to be used in a rocket motor wherein electrical connections must be positioned as close as possible.

Another object is to provide an electrical connector capable of withstanding a thrust force produced by the spinning of a rocket motor of 20,000–30,000 r.p.m.

A further object of this invention is to provide an electrical connector whose contact pressure increases with increase in rotational speed, insuring the integrity of the circuit at high spin rates.

A final object is to provide an electrical connector having a small axial thickness.

These and other objects and advantages of the present invention will be fully apparent from the following description when taken in connection with the annexed drawing, in which:

FIG. 1 is an enlarged axial cross section view, taken along line 1—1 of FIG. 4, and illustrates the assembled pancake connector of this invention;

FIG. 2 is a similar view on a smaller scale of the plug half of the connector;

FIG. 3 is a similar view of the socket half of the connector;

FIG. 4 is a top plan view of the assembled connector;

FIG. 5 is a bottom view of the plug half of the connector;

FIG. 6 is a top view of the socket half;

FIG. 7 is a sectional detail view taken along line 7—7 of FIG. 6;

FIG. 8 is a perspective view of one of the contact springs used with the plug half of the connector; and, FIG. 9 is a similar view of one of the contact springs used with the socket half of the connector.

With reference to the drawing in detail, in which like numerals indicate like parts throughout the several views, the reference numeral 10 designates generally the pancake connector of this invention.

The connector 10 consists of two parts, a male, or plug half 11, and a female or socket half 12. Both halves are made of electrical insulation material. The socket half is reinforced against centrifugal force by being press-fitted into a thin walled shell 13 which may be made of an aluminum alloy or similar material. A washer 14 may be interposed between the socket half 12 and the shell 13.

The plug half 11 defines an annular body having a central bore 15 (see FIG. 2). An annular flange 16 is integral with the upper portion thereof and is provided with symmetrically spaced radial bores 17 for admission of electrical leads, one lead 18 only being shown in FIG. 1. Eight radial bores are shown, but the number may vary as needed.

The downwardly extending portion 19 of plug 11 is provided with radial grooves 20 cut in its bottom face as best seen in FIGS. 2 and 5. These grooves are chamfered at their outer edges. Eight grooves 20 are shown to correspond with the number of radial bores 17 and are in parallel relation therewith.

Threaded bores 21 are provided in portion 19 and located, one each and substantially centered in each radial groove 20 (see FIG. 5). An angular spring contact 22 is secured in each groove 20 by a screw 23 in threaded bores 21. Holes 24 and 25 in contact 22 permit securement by screw 23 and attachment of a lead 18 respectively.

A locating stud 26 is fixed in portion 19 of plug 11 and extends radially outwardly therefrom, for a purpose to be obvious later.

Vertical, countersunk, threaded holes 27 are bored vertically in portion 19, for mounting purposes (see FIG. 5).

The socket 12 defines a disc-shaped body 28 having a central opening 29 and an annular groove 30 around its upper side. Its upper side is further provided with the same number of radial grooves 31 as in plug 11.

Vertical grooves 32 are cut in the inner peripheral surface of socket 12 and these grooves are aligned with grooves 31 as best seen in FIG. 3. The edges of the material between grooves 31 and 32 are chamfered as shown.

Internally threaded holes 33 are bored through socket 12 and are located substantially in the center of grooves 31, as shown and receive screws 23a for attachment of electrical connection.

Holes 34, bored vertically through socket 12, washer 14 and shell 13 provide a passageway for a lead 35 as seen in FIG. 7.

A vertical slot 36 cut in the inner wall of socket 12 provides a locating means for stud 26.

A spring contact 37 having a hole 38 is mounted in each groove 31 and is angular in shape so that one arm lies in a vertical slot 32 as shown. One of these contacts is shown in FIG. 9.

Countersunk holes 39 are bored through socket 12 for mounting purposes.

Spring contacts 22 and 37 are preferably made of thin phosphor bronze.

The manner of assembly is as follows:

Both plug 11 and socket 12 have the same number of radial grooves 20 and 31. Each of these grooves has spring contacts 22 and 37 mounted therein respectively.

A lead or leads 18 are passed through a radial bore 17 in plug 11 and attached either by solder to a spring contact 22 and soldered, or by a nut and bolt (not shown) in hole 25.

The lead, or leads, 35 which is to make electrical contact with lead, or leads 18 is threaded up through a hole 34, in socket 12, along annular groove 30 and secured under the head of a screw 23a. This is shown in FIG. 7.

Plug 11 and socket 12 are mounted, each, to other components, not shown, by screws also not shown, in mounting holes 27 and 38 respectively.

To make electrical connection, the plug 11 is inserted into socket 12 and spring contacts 22 and 37 are mated automatically by stud 26 which will be received in slot 36, so that the plug 11 and socket 12 will not be rotated. The spring contacts 22 and 37 being received in vertical grooves 32 further prevent rotational displacement of the halves of the connector 10.

It will be apparent that centrifugal force will tend to cause spring contacts 22 to be pressed against spring contacts 37 more tightly and insure a firm contact therebetween.

Since all components of both plug 11 and socket 12 are in coaxial balance, there would be no vibration caused by spin.

Although the connector 10 is especially adaptable for use in a rocket motor, other uses are obvious.

While only a preferred form of the invention is shown and described, other forms of the invention are contemplated and numerous changes and modifications may be made therein without departing from the spirit of the invention as set forth in the appended claims.

What is claimed is:

1. An electrical connector subjectable to high rotation including in combination, a plug and a socket, said plug comprising an annular body having a downwardly extending reduced portion formed with a series of symmetrically arranged, radial grooves cut in its bottom side, an angular spring contact having one arm detachably secured in each said groove for the attachment of an electrical lead thereto, the other arm of said contact extending upwardly and outwardly along the outer peripheral surface of said reduced portion, said socket comprising an annular body, there being a series of symmetrically arranged radial grooves cut in its upper side, an angular spring contact having one arm detachably secured in each of said last named grooves for the attachment of an electrical lead thereto, the other arm of said last named contact extending downwardly and inwardly along the inner peripheral surface of said socket whereby when said plug is inserted into said socket, said downwardly extending arm of a said spring contact on said socket will normally bias against said upwardly extending arm of a said spring contact on said plug, said bias increasing with centrifugal force when applied to said connector and means carried by said plug and said socket adapted to prevent rotational movement of said plug with respect to said socket and subsequental dis-alignment of said spring contacts on said plug and socket.

2. An electrical connector as set forth in claim 1 wherein said means preventing rotational movement of said plug and socket comprises a stud fixed radially in, and projecting from, said reduced portion and a vertical slot cut in the inner wall of said rocket whereby when said connection is assembled, the extending portion of said plug will slide into said slot.

References Cited by the Examiner
UNITED STATES PATENTS

| | | | |
|---|---|---|---|
| 2,113,328 | 4/1938 | Makenny | 339—176 X |
| 2,956,260 | 10/1960 | Bennett | 339—176 |
| 2,971,177 | 2/1961 | Linhart | 339—176 X |

EDWARD C. ALLEN, *Primary Examiner.*

W. DONALD MILLER, *Examiner.*